United States Patent

[11] 3,598,360

| [72] | Inventors | Delbert L. Merriner<br>Glendale;<br>Woodrow W. Miller, Los Angeles, both of, Calif. |
|---|---|---|
| [21] | Appl. No. | 853,402 |
| [22] | Filed | Aug. 27, 1969 |
| [45] | Patented | Aug. 10, 1971 |
| [73] | Assignee | Richdel, Inc.<br>Los Angeles, Calif. |

[54] SOLENOID VALVE
10 Claims, 2 Drawing Figs.

[52] U.S. Cl. .................................................. 251/129,
251/141, 335/260
[51] Int. Cl. .......................................................F16k 31/06,
H01f 3/00
[50] Field of Search............................................ 251/141,
129; 335/260, 262

[56] References Cited
UNITED STATES PATENTS

| 3,082,359 | 3/1963 | Mangiafico et al. .......... | 335/260 X |
| 3,140,073 | 7/1964 | Finck, Jr. ...................... | 251/129 |
| 3,331,042 | 7/1967 | Erickson et al. .............. | 251/129 X |
| 3,447,773 | 6/1969 | Huger............................ | 251/141 X |

FOREIGN PATENTS

| 1,358,872 | 3/1964 | France ......................... | 251/141 |

*Primary Examiner*—Arnold Rosenthal
*Attorney*—Jessup and Beecher

ABSTRACT: An improved solenoid valve is provided which is encapsulated in a thermosetting plastic to minimize the corrosive action of soil, fertilizers, or chemicals, when the valve is used, for example, in conjunction with a lawn sprinkling system, or the like. The solenoid valve is constructed to be encased in a molded thermosetting plastic housing, and which is formed to eliminate air voids around the energizing coil of the solenoid and which would have a tendency to produce a wicking action with resulting short circuiting of the coil. The solenoid valve also is constructed to minimize electrolytic action with its resultant deteriorating effects; this being achieved by maintaining similar metals throughout the structure, and by using epoxy adhesive, rather than soldered or brazed connections, to hold various components of the assembly together.

PATENTED AUG 10 1971

3,598,360

INVENTORS:
Delbert L. Merriner
Woodrow W. Miller
Jemp and Beecher

By Keith D. Beecher

ATTORNEYS

SOLENOID VALVE

BACKGROUND OF THE INVENTION

The improved solenoid valve of the invention is generally adapted for outdoor use, and it finds particular utility when used, for example, in conjunction with the valve assemblies for automatic sprinklers, such as described in U.S. Pat. No. 3,410,301, which issued Nov. 12, 1968. The improved solenoid of the invention is particularly suited for such applications, since it may be buried in the ground, or otherwise exposed to the corrosive effects of soil, fertilizers and chemicals, without any appreciable deterioration of the assembly. Also, the solenoid valve of the invention is constructed so that internal heating effects are minimized, even when the unit is buried in the ground, for example.

DETAILED DESCRIPTION OF THE ILLUSTRATED EMBODIMENT

Figure 1:
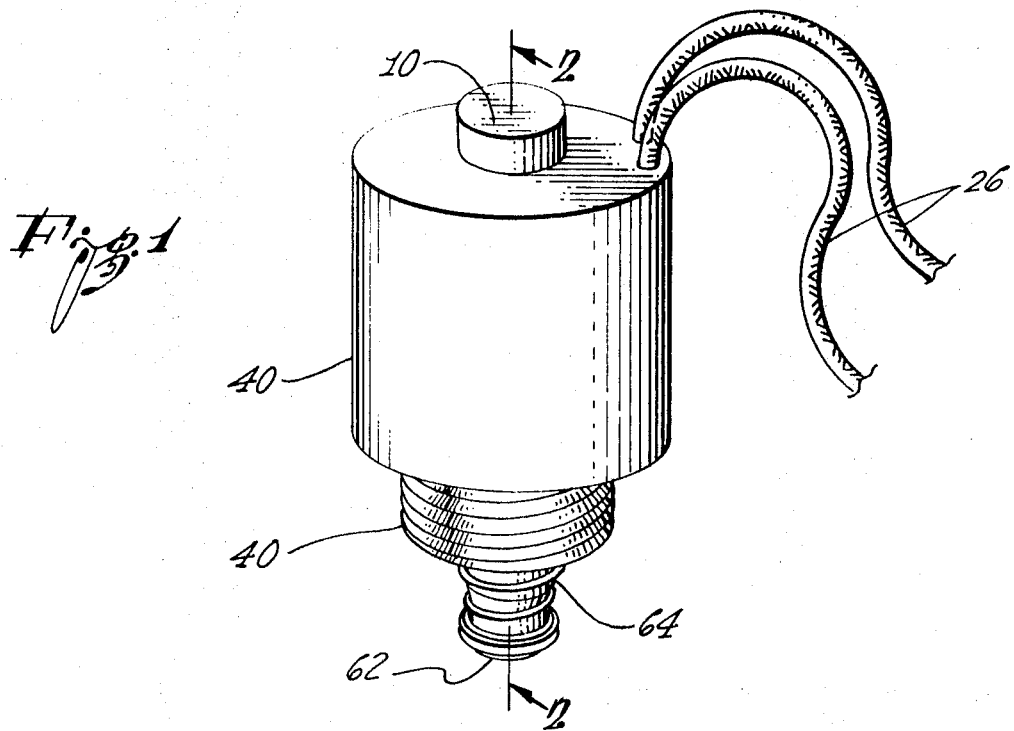
FIG. 1 is a side elevation showing a valve which may be constructed to embody the concepts of the invention.
Figure 2:
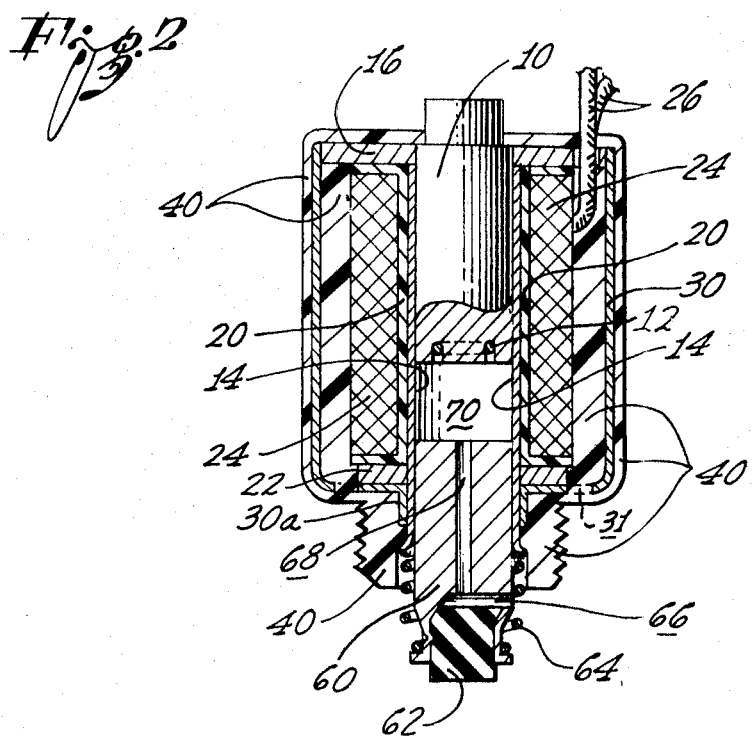
FIG. 2 is a sectional view taken essentially along the line 2-2 of FIG. 1.

The solenoid actuated valve assembly illustrated in FIGS. 1 and 2 includes, for example, a central magnetic core section 10 which may, for example, be in the form of an elongated circular rod, and which may be composed, for example, of 416F Series stainless steel. The upper end of the magnetic core section has a reduced diameter, so as to present a shoulder adjacent said upper end. The lower end of the magnetic core 10, for example, has an annular slot formed in it, and a copper ring 12 is swaged into the annular slot. The copper ring 12 forms a shading ring for the magnetic core 10, permitting the solenoid to respond to alternating current electrical energy.

The magnetic core 10 is inserted into a metallic sleeve 14 which may be composed of magnetic material such as 303 Series stainless steel. An upper washer 16 formed, for example, of cold rolled steel, is fitted over the upper end of the magnetic core 10 by a swagging action, and it surrounds the portion of the core directly adjacent the aforementioned shoulder. The sleeve 14 is attached to the core 10 by a suitable adhesive, such as an epoxy resin, and the upper end of the sleeve 14 abuts against the lower surface of the first washer 16.

A bobbin 20 formed, for example, of molded epoxy resin, is mounted on the sleeve 14, with the upper end of the bobbin abutting against the lower surface of the upper washer 16. A lower washer 22 which may be formed, for example, of cold rolled steel, is fitted over the sleeve 14 in a press friction fit therewith, and the lower washer abuts against the lower end of the bobbin 20. An electric energizing coil 24 is wound about the bobbin 20. The coil 24 is energized by means of a pair of leads 26 which extend through an opening in the upper washer 16.

A cup-shaped outer shell or casing 30 formed, for example, of cold rolled steel, is fitted over the sleeve 14, and its annular sidewall extends up from its base and around the winding 24 on the bobbin 20. The upper washer 16 closes the upper end of the shell 30, and the upper peripheral edge of the shell may be coined over the washer 16, as shown, to provide a unitary assembly. The lower washer 22 bottoms against the base of the shell 30, as shown. The central opening in the base of the shell 30, through which the sleeve 14 extends, may be pierced in the shell by a suitable piercing tool, with the metal forming an axially extending skirt portion 30a of the casing extending tightly around the lower part of the sleeve 14 to increase the surface contact between the shell and the sleeve for enchanced magnetic properties of the assembly. It has been found, for example, with units constructed in accordance with the teachings of the invention that increases up to 50 percent of the work force are realized over comparable prior art solenoids, and with the current reduced of the order of 20 percent.

The base of the shell 30 is perforated to have a plurality of holes, such as the hole 31, in it displaced radially from the central opening, as the upper washer 16. The subassembly is then placed in a mold, so that a molded thermosetting plastic housing 40 may be formed which completely encases the shell 30 and the upper washer 16, and which extends over the shoulder at the upper end of the core 10 and surrounds the core, so that only a small part of the core at its upper end protrudes through the plastic housing. During the molding process, the plastic flows through the holes in the base of the shell 30 and in the upper washer 16, so that the resulting plastic housing 40 extends over the internal surface of the shell 30 and directly around the electric energizing coil 24 on the bobbin 20. The lower end of the plastic housing 40 may be tubular with external threads formed thereon, as shown, so as to facilitate the mounting of the assembly.

The lower end of the sleeve 14 is flared outwardly, as shown, and it extends into the plastic material forming the housing 40 to provide a positive lock with the molded housing 40. The flared configuration of the sleeve serves also to facilitate the insertion of the plunger 60 of the solenoid assembly into the sleeve. The plunger 60 may be formed of an appropriate magnetic material such as 416F series stainless steel, and it slides axially in the sleeve 14, in a close fit within the sleeve.

The lower end of the plunger 60 is configured to receive a rubber valve 62. The valve 62 is normally seated on an appropriate valve seat (not shown) by means of a spring 64. The spring 64 is coiled around the plunger 60, and engages a shoulder at the lowermost end of the plunger, and the spring also engages a shoulder formed by the flared lower extremity of the sleeve 14. A passageway 66 extends radially into the plunger 60 and a further passageway 68 extends up the center of the plunger 60 from the passageway 66 to an internal chamber 70 between the lower end of the core 10 and the upper end of the plunger 60.

When the solenoid valve illustrated in FIGS. 1 and 2 and described above is deenergized, the spring 64 biases the valve 62 against its valve seat, and the valve member 62 is held firmly against its valve seat by water pressure flowing into the chamber 70 through the passages 66 and 68. However, when the solenoid valve is energized, the alternating current through the coil 24 creates a magnetic field through the core 10, and its associated magnetic components, including the upper washer 16, the shell 30, the lower washer 22, and the plunger 60. The shading ring 12, in a manner known to the art, then causes the core 10 to attract the plunger 60 towards it when the coil 24 is energized by alternating current, so that the valve 62 is pulled away from its seat, and against the pressure due to the fluid in the chamber 70. The action of the core 10 in attracting the plunger 60 is sufficient to overcome the pressure due to the water in the chamber 70.

In assembling the structure shown in the drawing, the various individual parts are first machined, and are heat treated to remove residual magnetism. The holes are pierced in the base of the shell 30, and in the upper washer 16, to permit the flow of molding material in and around the shell, so as to form the plastic housing 40. A central opening is also pierced in the center of the base of the shell 30 to receive the sleeve 14. As mentioned above, it is preferable during this latter piercing operation, not to remove the metal, but to cause it to form an axially extending skirt surrounding the central opening in the base, so as to provide a larger area contact between the shell 30 and the sleeve 14.

As a first assembling operation, the shading ring 12 is swaged into the annular slot at the lower end of the core 10, and the upper washer 16 is swaged over the upper end of the core. A band of an epoxy adhesive is then applied around the core 10 to a portion of the core just under the washer 16. The band of adhesive may be applied uniformly by means of a spatula and while the core 10 is rotating. The sleeve 14 may then be slipped over the core 10, while the core is rotating, and while the sleeve is held against rotation, for even distribution of the epoxy. The subassembly of the core 10, the washer 16 and the sleeve 14 is then baked for 1 hour to form a rigid unitary structure.

The aforesaid subassembly is then inserted into the bobbin 20, until the bobbin engages the underside of the upper washer 16, and the lower washer 22 is then pressed over the sleeve 14 and against the other end of the bobbin 20, the lower washer 22 has a close friction fit with the sleeve so as to hold the bobbin firmly on the subassembly. The coil 24 may previously have been wound on the bobbin 20, and appropriate leads 26 provided which extend out from the coil and through an appropriate opening in the upper washer 16. The washer 22 adds iron to the magnetic circuit of the solenoid.

The shell 30 is then fitted over the subassembly, with the sleeve 14 extending through the central opening in the base of the shell, and with the axial skirt surrounding the central opening forming a firm engagement with the outer surface of the sleeve. As mentioned above, the upper edge of the shell 30 may be coined over the upper washer 16, as shown, to hold the assembly together. The lower end of the sleeve 14 is then flared out to the configuration shown in FIG. 2. The flare may be, for example, at a 45° angle, and it serves as a positive lock between the sleeve and the plastic housing 40 which is subsequently molded about the assembly. The flare at the lower end of the sleeve 14 also facilitates the insertion of the plunger 60 into the sleeve.

Prior to the insertion of the plunger 60, however, a pin is inserted into the lower end of the sleeve 14 and is moved up against the lower surface of the core 10. The pin protrudes out through the lower end of the assembly, and it serves to hold the dimensions of the assembly, and also to support the assembly in the mold. The assembly is so supported at both ends, in cradle fashion, by the aforesaid pin and by the upper end of the core 10.

The plastic is inserted into the mold through a ring gate around the aforesaid pin, usual transfer molding techniques with thermosetting resin being used. The mold is in a heated condition, and plastic resin pellets are inserted into the hot mold at the lower end of the assembly shown in FIG. 2. The resulting molten plastic material flows around the shell 30 to form the outer casing or housing 40, and it also flows through the holes in the base of the shell 40 and through the holes in the upper washer 16 to form the inner portion of the housing 40 directly around the coil 24. The mold also forms the lower threaded portion of the housing 40 which serves as a mounting means for the assembly. The molded unit is then removed from the mold, and the plunger 60 and its associated components 62 and 64 are inserted to complete the assembly.

The invention provides, therefore, an improved solenoid actuated valve which is immune to the corrosive action of soil, fertilizers or chemicals, and may be mounted near or under the ground. The only exposed metal part of the solenoid valve is the upper extremity of the core 10 which, as indicated, may be formed of stainless steel, so as to minimize deterioration effects from external corrosive elements. Also, internal electrolysis is minimized in that similar metals are used throughout the structure. The only exception is the copper shading ring 12, which maybe nickel plated, so as to be compatible with the stainless steel of the core 10. Internal electrolysis, with its resulting deteriorating effects, is also minimized, by eliminating soldered or brazed connections with the solenoid, epoxy resin being used, for example, to secure the core 10 to the sleeve 14. This technique, moreover, is much less expensive than heliarc, silver brazing, or the like.

The improved solenoid actuated valve of the invention is also advantageous in that it may be constructed of readily available components, and may be assembled in a relatively inexpensive manner.

What we claim is:

1. A solenoid assembly including: an elongated rodlike central core section; a sleeve surrounding said core section and adhesively attached to said core section and having an end portion extending axially beyond one end of said core section; an electric energizing coil supported on said sleeve in coaxial relationship therewith; a shell of magnetizable material mounted coaxially on said sleeve and having an annular sidewall surrounding said sleeve and having a base through which said sleeve extends; and a plastic housing molded to the portion of said sleeve protruding through said base, and to said shell and electric coil, and encompassing both the inner and outer surfaces of said shell.

2. A solenoid assembly including: an elongated rodlike central core section; a sleeve surrounding said core section and having an end portion extending axially beyond one end of said core section; an electric energizing coil supported on said sleeve in coaxial relationship therewith; a shell of magnetizable material mounted coaxially on said sleeve and having an annular sidewall surrounding said sleeve and having a base through which said sleeve extends; a plastic housing molded to the portion of said sleeve protruding through said base, and to said shell and electric coil, and encompassing both the inner and outer surfaces of said shell; a washer of magnetizable material swaged against said core section and mounted coaxially with said core section and enclosing the end of said shell remote from said base.

3. The solenoid assembly defined in claim 2 in which said core, said sleeve, said shell and said washer are all formed of steel.

4. The solenoid assembly defined in claim 1 in which said central core section includes an annular slot at one end thereof; and a shading ring of electrically conductive material mounted in said slot.

5. The solenoid assembly defined in claim 1 in which the end of said sleeve extending axially beyond said core section is flared outwardly.

6. The solenoid assembly defined in claim 1 and which includes a plunger mounted in said axially extending end of said sleeve for axial movement therein, and spring means surrounding said plunger for biasing said plunger axially out of said sleeve.

7. The combination defined in claim 6 and which includes a resilient valve member mounted in the extremity of said plunger remote from said sleeve.

8. A solenoid assembly including: an elongated rodlike central core section; a sleeve surrounding said core section and having an end portion extending axially beyond one end of said core section; an electric energizing coil supported on said sleeve in coaxial relationship therewith; a shell of magnetizable material mounted coaxially on said sleeve and having an annular sidewall surrounding said sleeve and having a base, the base of said shell having a central opening therein through which said sleeve extends, said central opening being pierced to form an axially extending skirt portion extending around said sleeve and engagement therewith to increase the surface contact between said shell and said sleeve and enhance the magnetic properties of the assembly.

9. The solenoid assembly defined in claim 7 in which said plunger and said core section form a chamber within said sleeve, said plunger having a passageway extending therethrough for permitting fluid to flow into said chamber so as to force said plunger in a direction away from said core section.

10. The solenoid assembly defined in claim 2 in which said washer and the base of said shell have apertures therein to permit the plastic material forming said plastic housing to flow into the interior of said shell during the fabrication of said assembly.